United States Patent
Matsuhashi (10) Patent No.: US 7,540,726 B2
(45) Date of Patent: *Jun. 2, 2009

(54) SCROLL COMPRESSOR AND METHOD FOR MACHINING SCROLL WRAP

(75) Inventor: Hideaki Matsuhashi, Kyoto (JP)

(73) Assignee: Panasonic Corporation, Osaka (JP)

( * ) Notice: Subject to any disclaimer, the term of this patent is extended or adjusted under 35 U.S.C. 154(b) by 9 days.

This patent is subject to a terminal disclaimer.

(21) Appl. No.: 10/562,446

(22) PCT Filed: Oct. 24, 2003

(86) PCT No.: PCT/JP03/13635

§ 371 (c)(1),
(2), (4) Date: Dec. 27, 2005

(87) PCT Pub. No.: WO2005/003563

PCT Pub. Date: Jan. 13, 2005

(65) Prior Publication Data

US 2006/0159580 A1 Jul. 20, 2006

(30) Foreign Application Priority Data

Jul. 1, 2003 (JP) ............................. 2003-189350

(51) Int. Cl.
*F04C 15/00* (2006.01)
*B23D 1/02* (2006.01)
*B23B 5/36* (2006.01)
*B23P 15/30* (2006.01)

(52) U.S. Cl. .................... 418/1; 418/55.1; 418/55.2; 409/293; 409/313; 82/1.11; 82/18; 82/13; 82/123; 29/888.022

(58) Field of Classification Search ............... 418/1, 418/55.2; 409/313, 293; 82/1.11, 18, 13, 82/123; 29/888.022
See application file for complete search history.

(56) References Cited

U.S. PATENT DOCUMENTS

| | | | | |
|---|---|---|---|---|
| 3,857,305 | A * | 12/1974 | Lichtman | 76/115 |
| 4,512,066 | A * | 4/1985 | McCullough | 29/889.23 |
| 4,615,091 | A * | 10/1986 | Niwa et al. | 29/888.022 |
| 4,824,345 | A * | 4/1989 | Fukuhara et al. | 418/55.2 |
| 5,231,264 | A * | 7/1993 | Fujita | 219/121.78 |
| 5,320,505 | A * | 6/1994 | Misiak et al. | 418/55.1 |
| 5,564,185 | A * | 10/1996 | Saeki et al. | 29/888.022 |
| 5,581,880 | A * | 12/1996 | Iio et al. | 29/888.022 |
| 5,651,648 | A * | 7/1997 | Furey et al. | 409/131 |
| 5,765,976 | A * | 6/1998 | Ozaki et al. | 409/293 |
| 6,086,341 | A * | 7/2000 | Fukuhara et al. | 418/55.2 |

(Continued)

FOREIGN PATENT DOCUMENTS

EP    1162018 A1 * 12/2001

(Continued)

*Primary Examiner*—Thomas E Denion
*Assistant Examiner*—Mary A Davis
(74) *Attorney, Agent, or Firm*—Wenderoth, Lind & Ponack, L.L.P.

(57) ABSTRACT

By cutting-machining a side face of a scroll wrap with a non-rotational tool, swells in the perimeter direction have a smaller size. Thus, compressed gas is prevented from leaking between relatively slidable side faces of the respective wraps of the stationary scroll and the slewing scroll. This configuration provides a scroll compressor that has a higher accuracy and thus high compression efficiency and low noise are realized.

7 Claims, 10 Drawing Sheets

U.S. PATENT DOCUMENTS

| | | | |
|---|---|---|---|
| 6,122,824 A * | 9/2000 | Jensen | 29/888.023 |
| 7,237,992 B2 * | 7/2007 | Matsuhashi et al. | 409/293 |
| 7,293,945 B2 * | 11/2007 | Matsuhashi et al. | 409/313 |
| 2004/0221696 A1 * | 11/2004 | Matsuhashi et al. | 82/1.11 |
| 2006/0133904 A1 * | 6/2006 | Matsuhashi et al. | 82/1.11 |

FOREIGN PATENT DOCUMENTS

| | | |
|---|---|---|
| JP | 4-284509 | 10/1992 |
| JP | 7-164231 | 6/1995 |
| JP | 2000-205155 | 7/2000 |
| JP | 2001032786 A * | 2/2001 |
| JP | 2002-263987 | 9/2002 |
| JP | 2004351606 A * | 12/2004 |
| KR | 1995-27195 | 10/1995 |
| WO | WO 8908522 A1 * | 9/1989 |

* cited by examiner

SCROLL COMPRESSOR AND METHOD FOR MACHINING SCROLL WRAP

This application is a U.S. national phase application of PCT International Application PCT/JP2003/013635.

TECHNICAL FIELD

The present invention relates to a scroll compressor used for a refrigerating apparatus, an air-conditioning apparatus or the like, and a method for machining a scroll wrap.

BACKGROUND ART

Figure 12:
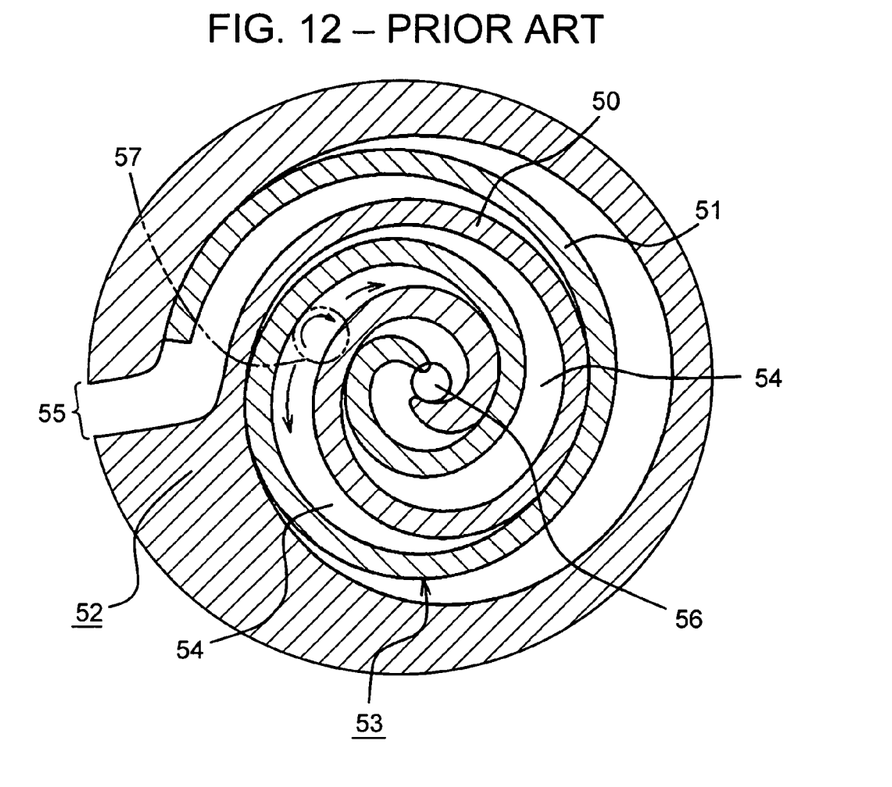
FIG. 12 is a lateral sectional view illustrating a stationary scroll and a slewing scroll of a conventional scroll compressor and the machining method thereof.
Figure 13:
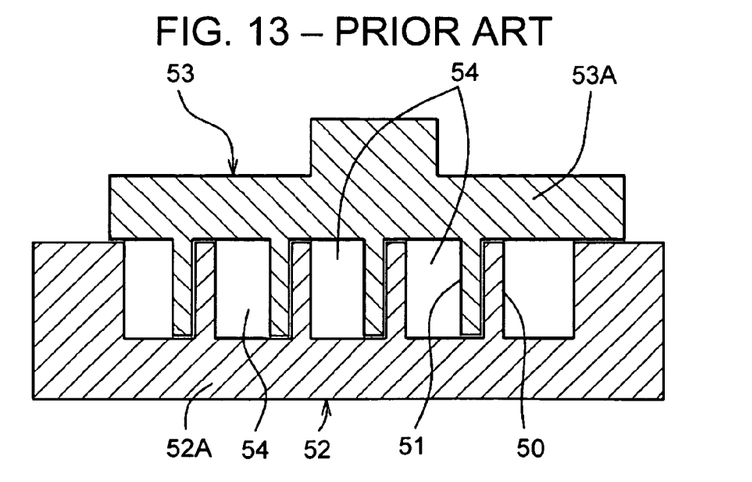
FIG. 13 is a longitudinal sectional view illustrating the stationary scroll and the slewing scroll shown in FIG. 12.

A scroll compressor mainly has a structure shown in FIG. 12 and FIG. 13. Stationary scroll (hereinafter referred to as scroll) 52 and slewing scroll (hereinafter referred to as scroll) 53 are respectively shaped such that scroll-like wraps 50 and 51 are raised from end plates 52A and 53A so as to be substantially perpendicular to the end plates. In scroll 52 and scroll 53, wraps 50 and 51 are engaged to each other to have compression space 54 therebetween. A capacity of compression space 54 is decreased by a circular orbit motion of scroll 53 while compression space 54 moves from an outer circumference leading to inhale opening 55 to a center part leading to discharge opening 56. Thus, fluid is inhaled, compressed, and discharged.

Scrolls 52 and 53 are made by metal mainly of iron or aluminum. After they are formed by a casting or the like, the side faces of wraps 50 and 51 which slide relative to each other are finished by being cut by end mill 57 having 2 to 10 cutting blades. In this manner, a required performance is secured.

Methods for finishing an involute curve-shaped scroll wrap by an end mill are disclosed by Japanese Patent Unexamined Publication No. H04-284509, Japanese Patent Unexamined Publication No. H07-164231, and Japanese Patent Unexamined Publication No. 2000-205155, for example. According to these publications, the feed rate of the end mill is controlled depending on the curvature radius of the involute curve. Any of these methods secures the plane roughness of a machined face.

However, in the case of cutting and finishing by machining by end mill 57, the side walls of wraps 50 and 51 have an accuracy that depends not only on the machining accuracy of end mill 57 but also on a runout due to an error at which end mill 57 is attached, and also on the machining conditions. Thus, it is difficult to secure and manage a favorable accuracy in a stable manner, and a poor surface roughness is the result. In order to prevent leakage of compressed gas by reducing the clearance between the side faces of scrolls 52 and 53 while they are engaged to each other, it is necessary that the dimensional accuracies of the side faces be improved.

Furthermore, each of end plates 52A and 53A has a large surface roughness because they are cut by end mill 57 together with the side faces of wraps 50 and 51. The rough surface includes a sharp tip end at each convex. The sharp tips cause a sliding loss and a leakage loss of compressed gas, and thus the efficiency of the compressor is insufficient and deteriorates easily.

Furthermore, the machining by end mill 57 is generally performed with 20,000 revolutions per minute in order to suppress the abrasion of the blade edge. Thus, in order to secure the machining efficiency, the feed amount per one rotation needs to be increased. If the feed amount per one rotation is increased, uneven machining is caused in a regularly-repeated manner due to the existence of a part of end mill 57 having the cutting blade and a part having no cutting blade. This uneven machining is caused with a pitch inversely proportional to the number of the cutting blades. Furthermore, an error caused when end mill 57 is attached also causes a regularly-repeated runout, causing swells in the longitudinal direction of the side faces of wraps 50 and 51. These swells cause minor vibrations in scroll 53 while the compressor is being operated, thus increasing noise.

Furthermore, when corners of side faces of wraps 50 and 51 and corners of end plates 52A and 53A at the boundary are abraded by sliding contact with the corner of the tip end of the outer circumference of end mill 57, the shapes of corners of side faces of wraps 50 and 51 and the shapes of corners of end plates 52A and 53A are changed. In consideration of this, the inner and outer corners of the upper end face of an upper wrap engaged with a lower wrap need to be provided with a large chamfer and thus a space provided therebetween is increased. This increases the leakage of compressed gas, deteriorating the efficiency of the scroll compressor.

SUMMARY OF THE INVENTION

The scroll compressor of the present invention has a stationary scroll and a slewing scroll in which scroll-like wraps raised from the respective end plates of the respective scrolls are engaged to each other to provide a compression space therebetween. Then, fluid is inhaled, compressed, and discharged by using the circular orbit motion of the slewing scroll to allow the compression space to move from the outer periphery leading to an inhale opening to the center part leading to a discharge opening while reducing the capacity. At least any of side faces sliding to each other of the respective wraps has a machining mark parallel to the end plate. This face is a face cutting-machined by a non-rotational tool. A side face of the wrap perpendicular to the end plate has a shape of non-rotation machining obtained by Hale machining.

DETAILED DESCRIPTION OF PREFERRED EMBODIMENTS

Hereinafter, a scroll compressor and a method for machining the scroll wrap according to embodiments of the present invention will be described with reference to the drawings. Elements similar to those in a previous embodiment have the same reference marks as those in the previous embodiment, and detailed descriptions thereof are omitted.

First Exemplary Embodiment

Figure 1:
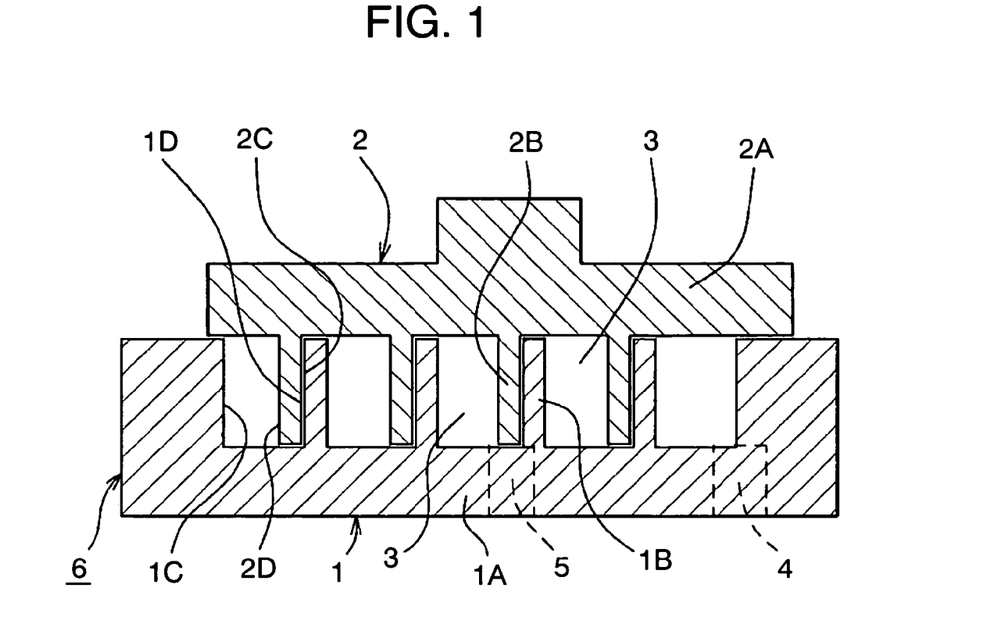
FIG. 1 is a longitudinal sectional view illustrating a stationary scroll and a slewing scroll of a scroll compressor according to a first exemplary embodiment of the present invention.

First, a scroll compressor according to a first exemplary embodiment of the present invention will be described with reference to FIGS. 1 and 11. Stationary scroll (hereinafter referred to as scroll) 1 and slewing scroll (hereinafter referred to as scroll) 2 are shaped so that scroll-like wraps 1B and 2B are raised from end plates 1A and 2A so as to be substantially perpendicular to the end plates, respectively. Scrolls 1 and 2 are provided so that wraps 1B and 2B are engaged to each other to have compression space 3 therebetween. A capacity of compression space 3 is decreased by a circular orbit motion of scroll 2 while compression space 3 moves from an outer circumference of scroll 1 leading to inhale opening 4 to a center part of scroll 1 leading to discharge opening 5. Thus, scroll compressor (hereinafter referred to as compressor) 6 inhales, compresses, and discharges fluid in such a manner.

Compressor 6 is stored in sealed container 7 together with motor 8 for driving scroll 2, thereby providing a maintenance-free compression apparatus for air-conditioning. Thus, fluid to be inhaled, compressed, and discharged is a cooling medium. However, the present invention is not limited to this and may have any structure so long as the structure is provided so that a stationary scroll and a slewing scroll having scroll-like wraps are engaged to each other to provide a compression space to use the circular orbit motion of the slewing scroll to inhale, compress, and discharge fluid. Fluid to be handled is also not limited.

The inner periphery of sealed container 7 is fixed with stator 8A of motor 8. Rotor 8B of motor 8 is fixed to crank shaft 16 for driving scroll 2 of compressor 6. Main bearing member 18 and sub bearing member 20, which are fixed to the inner periphery of sealed container 7, axially support crank shaft 16 in a rotatable manner. Since the present exemplary embodiment shows a horizontal placement type compressor, one main bearing member 18 and one sub bearing member 20 axially support crank shaft 16. However, in the case of a vertical placement type compressor, crank shaft 16 may be supported by one support. The lower part of sealed container 7 is lubrication storage 17.

Scroll 1 is attached to main bearing member 18 by a bolt for example. Scroll 2 and main bearing member 18 have therebetween an Oldham's coupling 19 for preventing scroll 2 from rotating on its axis and for causing only a slewing motion (i.e., circular orbit motion) thereof. At the back face of scroll 2, there is provided stewing shaft 25 for driving the rotation and the slewing shaft 25 is inserted into eccentric bearing 26 in journal shaft 16A provided at one end of shaft 16. In accordance with the rotation of journal shaft 16A when crank shaft 16 is rotated, scroll 2 has a circular orbit motion via eccentric bearing 26 and slewing shaft 25. In sub bearing member 20, an end part of crank shaft 16 has oil feeding mechanism 27 and oil-suction tube 27A immersed in lubrication storage 17.

On the other hand, crank shaft 16 includes therein oil-feeding path 28. Crank shaft 16 drives oil feeding mechanism 27 and oil-suction tube 27A sucks lubrication oil in from lubrication storage 17. Then, lubrication oil lubricates the respective sliding parts of compressor 6 via oil-feeding path 28 and is discharged into sealed container 7. Thereafter, lubrication oil is sent through the clearance between motor 8 and sealed container 7 to return to oil-suction tube 27A. The cooling medium inhaled by compressor 6 from inhale tube 29 is compressed in compression space 3 and is sent via discharge opening 5 and discharge tube 30 provided in sealed container 7, thereby being discharged out of sealed container 7.

In compressor 6 of the present exemplary embodiment, at least one of side faces 1C and 2D of the respective wraps 1B and 2B slide relative to each other and at least one of side faces 1D and 2C of the respective wraps 1B and 2B are cutting-machined by Hale machining. F or example, side faces 1C and 1D of wrap 1B of scroll 1 are Hale-machined by non-rotational tool 9 or the like shown in FIGS. 2A, 3A and 3B. Non-rotational tool 9 shown in FIGS. 3A and 3B is a Hale tool for which, when the cutting face cuts a material to be cut, the cutting face is moved relative to the material to be cut so as to be substantially perpendicular to the direction along which the cutting is performed. Machining processes other than this are not particularly limited. In other words, metal material such as iron and aluminum is basically formed by a casting or the like, cutting-machined by an end mill and subsequently finished by Hale machining with non-rotational tool 9 or the like. Alternatively, the cutting machining by end milling may be omitted.

In this manner, at least one of side faces 1C and 2D of scroll-like wraps 1B and 2B which slide relative to each other and at least one of side faces 1D and 2C of scroll-like wraps 1B and 2B which slide relative to each other are finished by Hale machining. An example is shown in FIG. 2B in which side faces 1C and 1D of wrap 1B of scroll 1 are Hale-machined and side faces 2C and 2D of wrap 2B of scroll 2 are not finished by Hale machining but are finished by an end mill. By providing the structure as described above, side faces 1C and 1D have no swell in the longitudinal direction or, even in a case where such swells are caused, the swells will be much smaller than that caused in side faces 2C and 2D. In the case of a polishing-machining by an end mill, the machining conditions change in a cyclic manner depending on a part having a blade and a part having no blade. Furthermore, the polishing-machining by an end mill causes uneven machining because of the eccentric motion of the tool depending on an accuracy with which the tool is attached or the rotation accuracy of a machine for the machining. In contrast, Hale machining does not cause such uneven machining. In the case of the machining by a non-rotational tool, a polishing-machined side face does not have a swell in the longitudinal direction due to an eccentricity, even when the tool is attached with a slight inclination.

Furthermore, a surface finished by Hale machining has a fine texture. Thus, if one of side faces 1C and 2D and one of side faces 1D and 2C are Hale-machined respectively, the wraps 1B and 2B do not have therebetween a clearance within the sliding area in the direction along which they are raised that may cause the leakage of compressed gas. As a result, the leakage of compressed gas as described above is prevented, improving the compression efficiency.

As described above, the side faces of wraps 1B and 2B that are Hale-machined have little or no swell at the periphery and the side faces of wraps 1B and 2B have a smooth surface. As a result, scroll 2 has a circular orbit motion without having a minute vibration during the operation thereof. Thus, a scroll compressor can be obtained whose operation noise is lower than that of the conventional one. Furthermore, abrasion is also reduced.

Figure 4A:
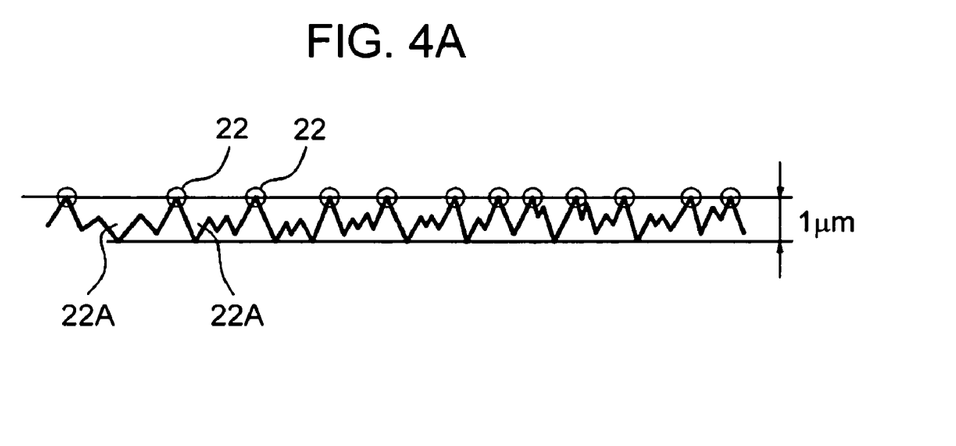
FIG. 4A is a schematic view illustrating the surface roughness in the case of the machining by Hale machining in the first exemplary embodiment of the present invention.
Figure 4B:
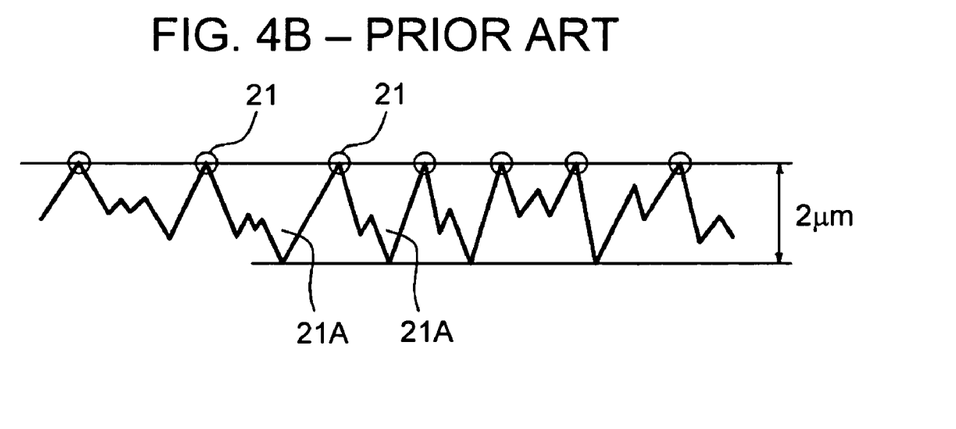
FIG. 4B is a schematic view illustrating a surface roughness in the case of a machining by a prior art end mill.

As shown in FIG. 4B, the machining by an end mill causes a surface roughness of 2 μm. On the other hand, the surface roughness caused by finishing by Hale machining is 1 μm as shown in FIG. 4A, which is a half of 2 μm. Furthermore, convex 22 of a surface roughness by Hale machining is less sharp than that of convex 21 of a surface roughness by the machining by an end mill. This almost solves the possibility of abrasion starting from a local fusion due to heat caused by the contact of convexes. Thus, by reducing the sliding resistance, the abrasion resistance is improved. Furthermore, concave 22A of a surface roughness by Hale machining is smaller than concave 21A by the machining by an end mill. Thus, the leakage of compressed gas can be suppressed more effectively. In this manner, a highly-reliable scroll compressor is obtained.

Figure 11:
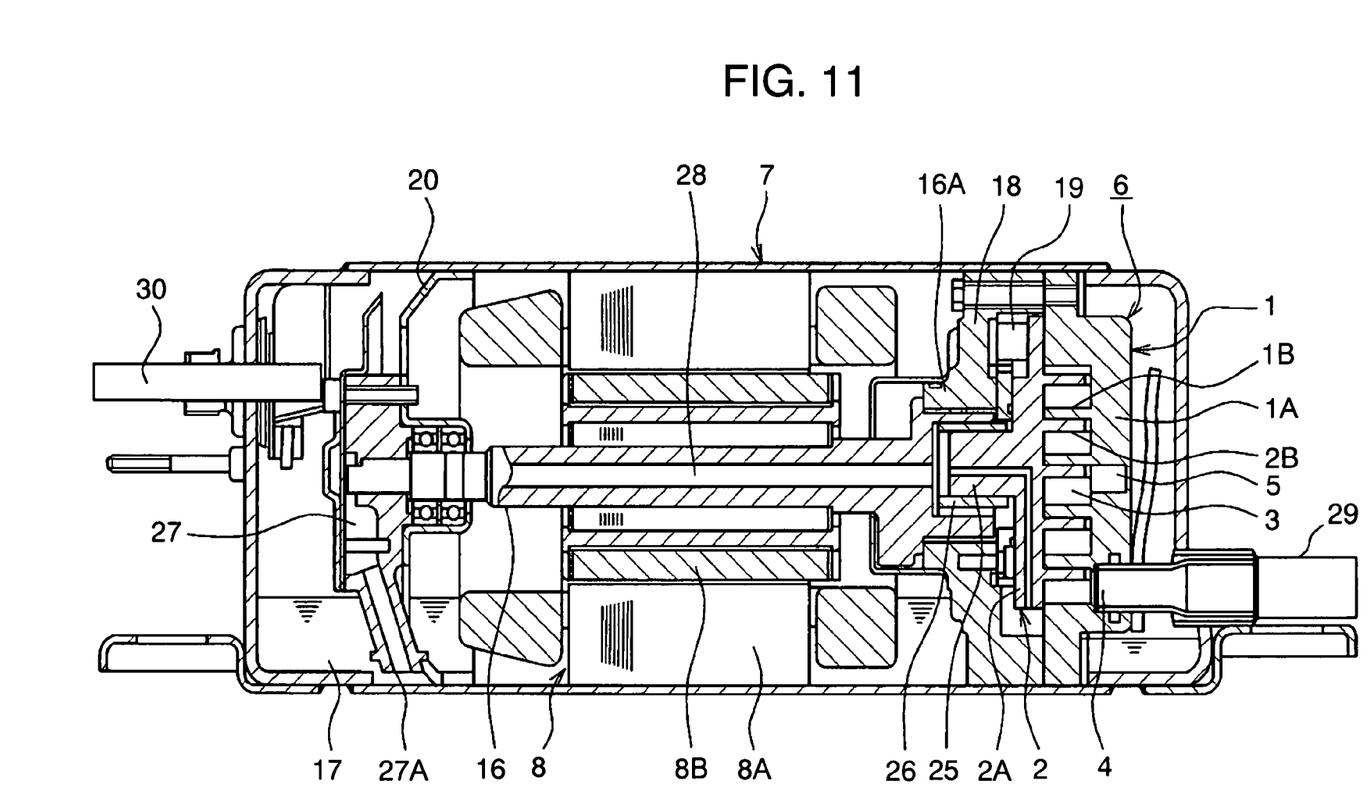
FIG. 11 is a sectional view illustrating the entire constitution of a sealed type scroll compressor in the respective embodiments of the present invention.

Therefore, the structure as described above is convenient and the maintenance free sealed type scroll compressor as shown in FIG. 11 guarantees to function for a long period of time, 10 years, for example. Preferably, both of side faces 1C and 2D which slide relative to each other and both of side faces 1D and 2C which slide relative to each other are Hale-machined as described above.

An example of the method of Hale machining for scroll-like wraps 1B and 2B as described above is shown in FIG. 2A. Non-rotational tool 9 is chucked to the tip end of machining shaft 11 whose movement is controlled. This assembly is used as a non-rotational cutting tool so that center axis line 12 of non-rotational tool 9 is parallel to center axis line 13 of scrolls 1 and 2. In this status, non-rotational tool 9 is moved along the longitudinal direction of wraps 1B and 2B while being set to the subjects to be Hale machined, such as side face 1C. In this manner, Hale machining by non-rotational tool 9 is performed. However, a specific method for performing Hale machining can be selected freely. The surface roughness caused by Hale machining is preferably suppressed to be equal to or lower than 1 μm in order to take the advantage by Hale machining as described above.

Figure 2A:
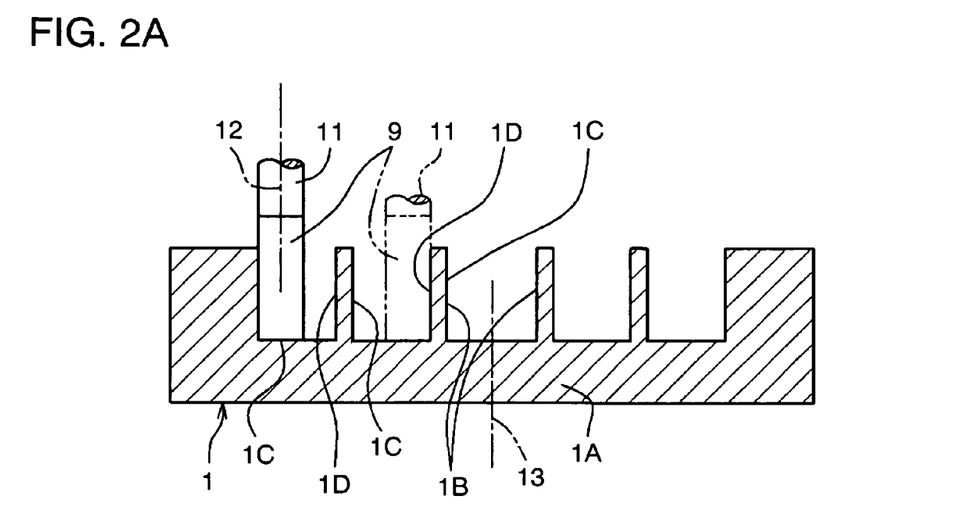
FIG. 2A is a longitudinal sectional view illustrating a method for machining the stationary scroll of a compressor in the first exemplary embodiment of the present invention.
Figure 2B:
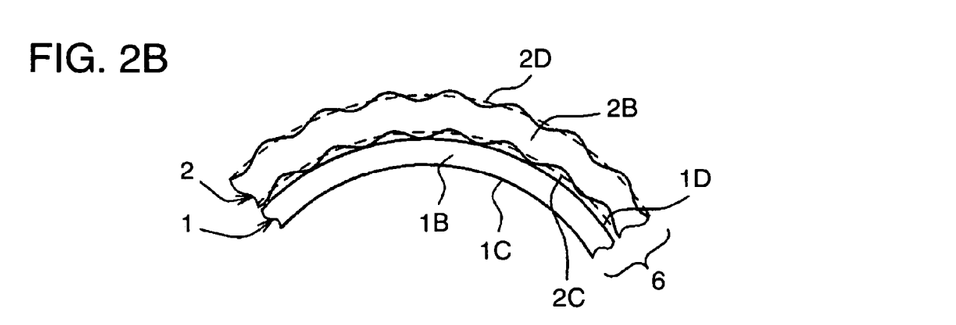
FIG. 2B is a lateral sectional view illustrating swells in the longitudinal direction of a wrap of the compressor in the first exemplary embodiment of the present invention.
Figure 3A:
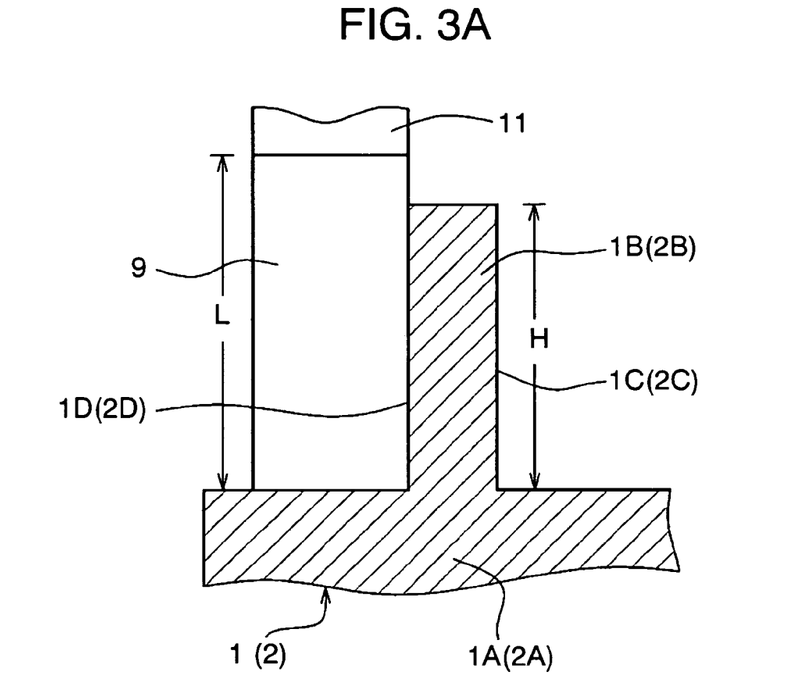
FIG. 3A is a schematic sectional view illustrating a method for machining the stationary scroll of the compressor in the first exemplary embodiment of the present invention.
Figure 3B:
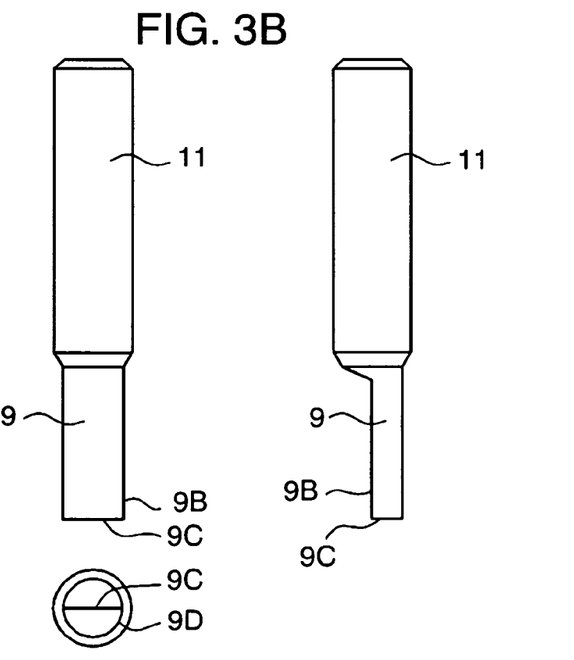
FIG. 3B illustrates a Hale machining tool seen from three directions that is a non-rotational tool for machining a side face of the wrap of the compressor in the first exemplary embodiment of the present invention.

As shown in FIGS. 2A and 3A, length L of non-rotational tool 9 is preferably longer than raised part height H of wraps 1B and 2B whose side faces are Hale-machined. When non-rotational tool 9 as described above is used, non-rotational tool 9 can be set at any point within raised part height H of wraps 1B and 2B. Thus, it is only necessary to move non-rotational tool 9 in the longitudinal direction of wraps 1B and 2B to provide the Hale machined shape of the side face of the scroll. This eliminates the time and adjustment required when a cutting machining process is divided into a plurality of steps. As a result, the machining accuracy is increased and the machining time is reduced, providing a low-cost scroll compressor.

Figure 2C:
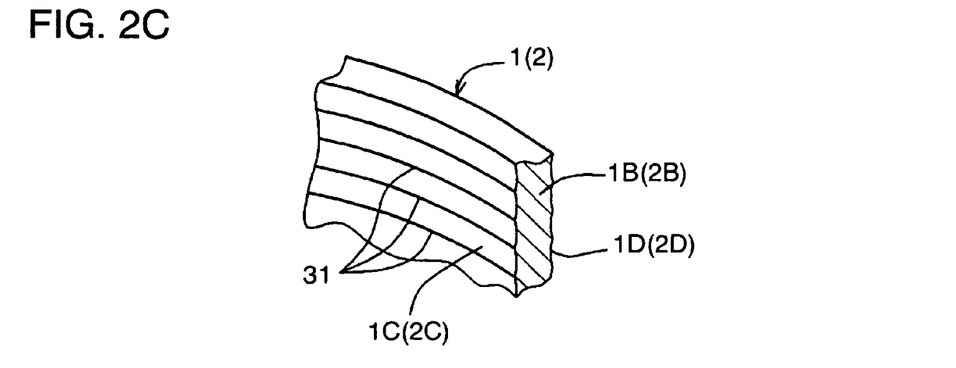
FIG. 2C is a perspective view illustrating machining marks continuing in the longitudinal direction of the wrap of the compressor in the first exemplary embodiment of the present invention.

When the machining as described above is performed, the machine-finishing by non-rotational tool 9 is performed such that non-rotational tool 9 does not move back and forth in the direction of tool center axis line 12. As a result, microscopic concavity and convexity as shown in FIG. 2C are caused in the direction perpendicular to end plates 1A and 2A along which wraps 1B and 2B are raised. Specifically, during Hale-machining, machining marks 31 are formed in a direction along which non-rotational tool 9 is moved relative to the side faces of wraps 1B and 2B. The machining marks 31 formed by non-rotational tool 9 during Hale machining continue along the longitudinal direction of wraps 1B and 2B. Machining marks 31 as described above significantly reduce the swells caused at the Hale-machined side faces of wraps 1B and 2B in the longitudinal direction. Thus, when scroll 2 is in slewing motion or has a circular orbit motion relative to scroll 1, there is no minute vibration, thus a scroll compressor having reduced noise is provided.

In many cases, machining marks 31 as described above are obtained by transferring the shape of the blade of non-rotational tool 9 to the side face. Thus, machining mark 31 on the side face can be formed to have an arbitrary shape by shaping the blade of non-rotational tool 9. In order to sufficiently realize the characteristics of Hale machining as described above, although any method for machining a substrate may be used, the amount of finishing allowance for Hale machining is required. However, in Hale machining, the finishing allowance is not influenced by the condition of the substrate face. Furthermore, a determined finishing allowance is preferably machined by one Hale machining operation as described above.

Second Exemplary Embodiment

Figure 5:
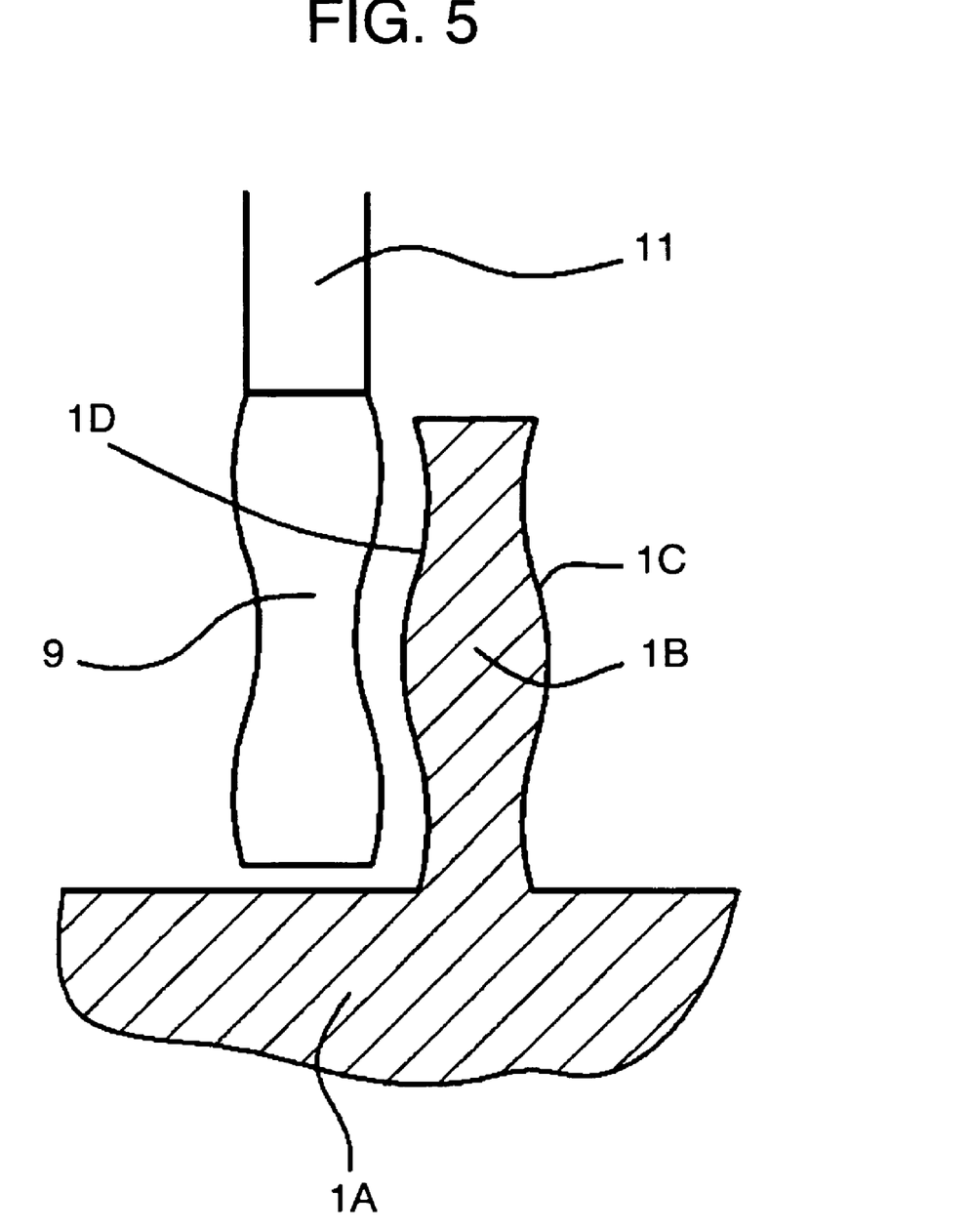
FIG. 5 is a schematic sectional view illustrating the machining method of a stationary scroll of a compressor in a second exemplary embodiment of the present invention.

FIG. 5 is a schematic sectional view illustrating a method for machining a stationary scroll in a second exemplary embodiment of the present invention. In the present exemplary embodiment, the shape of the blade of non-rotational tool 9 at its side face may be managed as required by the polishing machining of the blade. The blade having the shape is used to machine wrap 1B or the like so that the shape of the blade is transferred in the direction along which side faces 1C and 1D to be Hale machined of stationary scroll 1 are raised i.e., a direction perpendicular to end plate 1A. By machining so, the shape of the side face of wrap 1B or the like perpendicular to end plate 1A, i.e., the shape in the direction of center axis line 13, can be managed by managing the shape of non-rotational tool 9. Wrap 1B or the like of stationary scroll 1 is Hale-machined. As a result, the shape is optimally provided while being applied with heat and pressure during the operation in an easy and stable manner. This reduces the leakage of compressed gas during the operation, providing a highly efficient scroll compressor.

Machining mark 31 as described above may be also achieved by a cutting machining other than by a Hale machining, for example, by a grind stone. Thus, the effect for reducing the swell in the longitudinal direction of wraps 1B and 2B depending on the status of machining mark 31 is achieved regardless of the difference of a machining method.

Third Exemplary Embodiment

Figure 6:
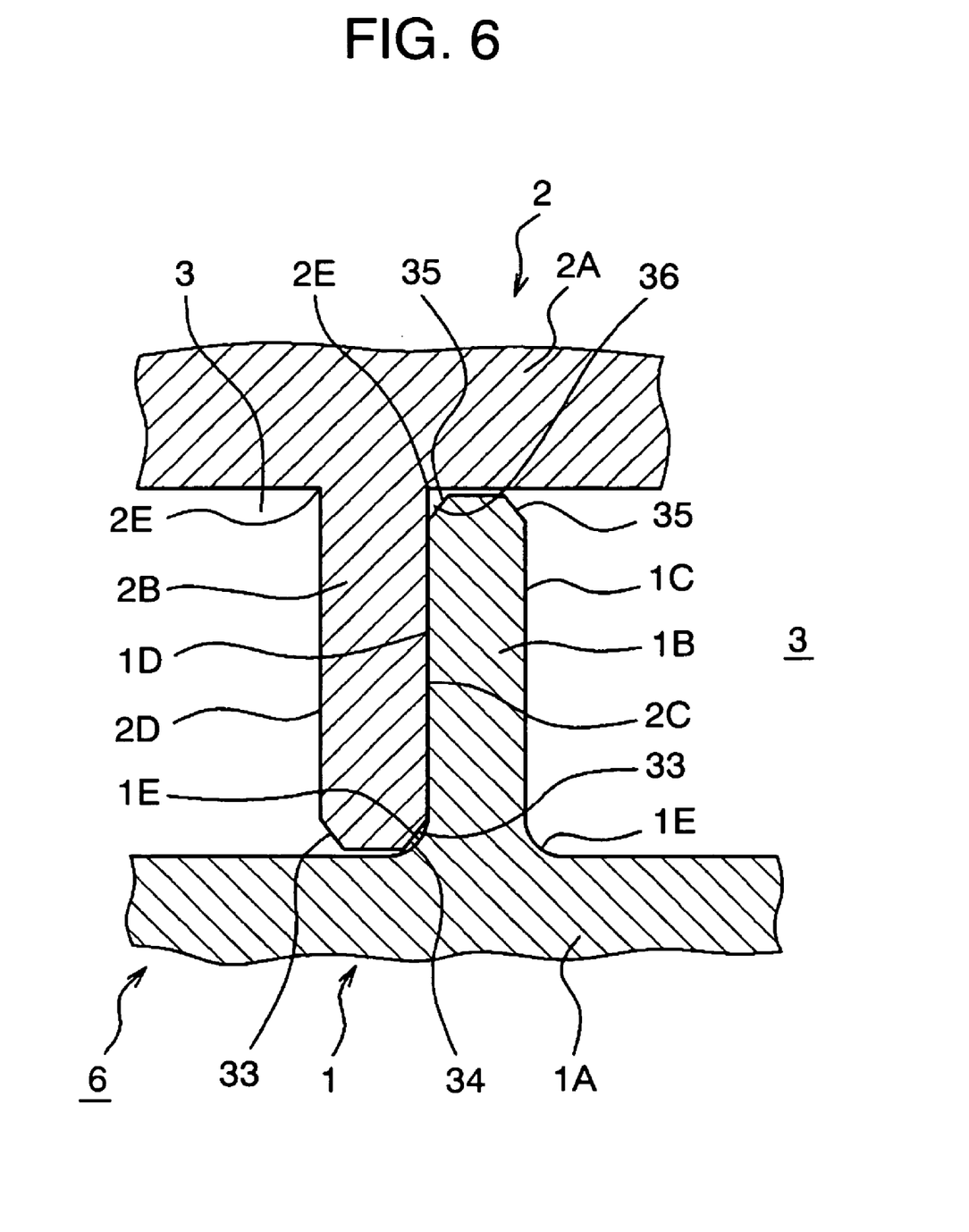
FIG. 6 is a schematic sectional view illustrating the machining method of a stationary scroll of a compressor in a third exemplary embodiment of the present invention.

FIG. 6 is a schematic sectional view illustrating a method for machining a stationary scroll in a third exemplary embodiment of the present invention. In the present exemplary embodiment, each of corner parts 1E at boundary parts between side faces 1C and 1D of wrap 1B of stationary scroll 1 and end plate 1A thereof has a curved surface.

Spaces 34 are provided between inner and outer chamfered corner parts 33 at the tip end of wrap 2B in slewing scroll 2 and corner parts 1E of stationary scroll 1. Spaces 36 are also provided between corner parts 2E of slewing scroll 2 having no curved surfaces and inner and outer chamfer parts 35 at the tip end of wrap 1B in stationary scroll 1. By providing corner part 1E with a curved surface, space 34 is several times smaller than space 36. Thus, the leakage of compressed gas through space 34 is reduced, providing a scroll compressor having high compression efficiency. The structure as described above is applied to stationary scroll 1 in the present exemplary embodiment. However, the structure also may be preferably applied to slewing scroll 2.

Fourth Exemplary Embodiment

Figure 7:
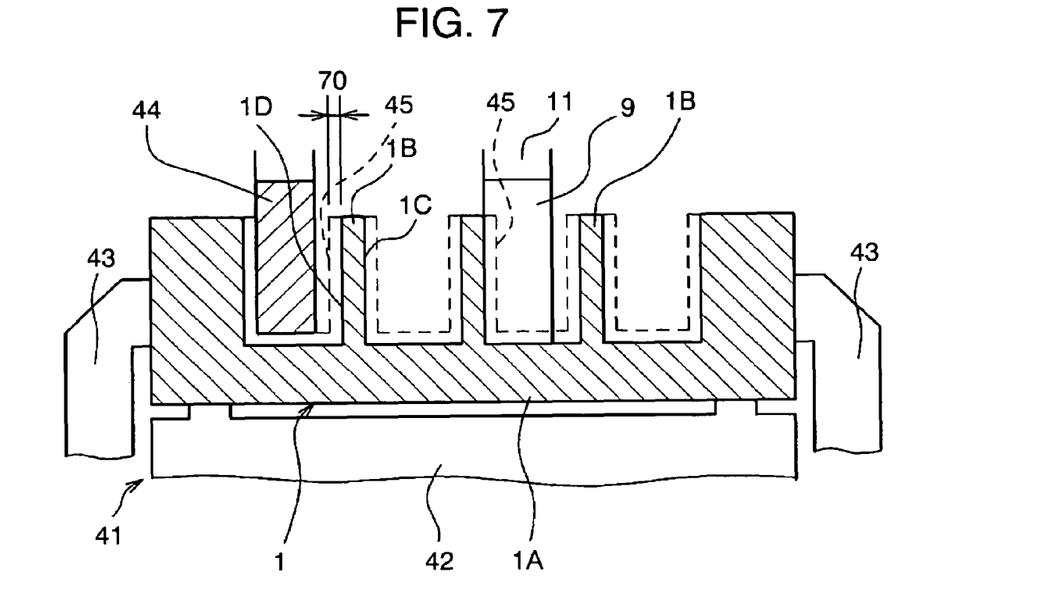
FIG. 7 is a schematic sectional view illustrating the machining method of a stationary scroll of a compressor in a fourth exemplary embodiment of the present invention.

FIG. 7 is a schematic sectional view illustrating a method for machining a stationary scroll in a fourth exemplary embodiment of the present invention. In the present exemplary embodiment, stationary scroll 1 to be polished is fixed on chucking table 42 by chucking apparatus 41. In this chucking, at least two positions at the periphery of stationary scroll 1 are chucked and fixed by chucking member 43. While being in this condition, a predetermined uniform cutting-machined face is obtained out of a substrate by a casting or the like by cutting-machining with end mill 44 in an amount of the cutting allowance. Thereafter, stationary scroll 1 is Hale-machined by non-rotational tool 9 without being detached from chucking apparatus 41 used for machining by end mill 44.

As a result, even when finishing allowance 70 in Hale machining by non-rotational tool 9 is reduced to about 0.01 mm, the remainder of previously-machined face 45 that was cutting-machined by end mill 44 can be eliminated. Thus, a component having a high quality is obtained. Wrap 1B in particular frequently has a complicated shape, for example, an involute shape. Due to this reason, if wrap 1B is once detached from chucking apparatus 41 prior to a finishing step, the center or angle is dislocated. In this case, if finishing allowance 70 is smaller than about 0.05 mm, previously-machined face 45 remains, causing a defective quality. As stationary scroll 1 is Hale-machined without being detached from chucking apparatus 41, finishing allowance 70 is uniform and thus the load to non-rotational tool 9 is stabilized, thus providing a steady machining accuracy. Finishing allowance 70 is also minute and thus the load to non-rotational tool 9 is small, thus providing a long service life to non-rotational tool 9. As a result, a scroll compressor having a high quality and a low cost is obtained. The method as described above is applied to stationary scroll 1 in the present exemplary embodiment as a typical example. However, the method also may be preferably applied to slewing scroll 2.

Fifth Exemplary Embodiment

Figure 8:
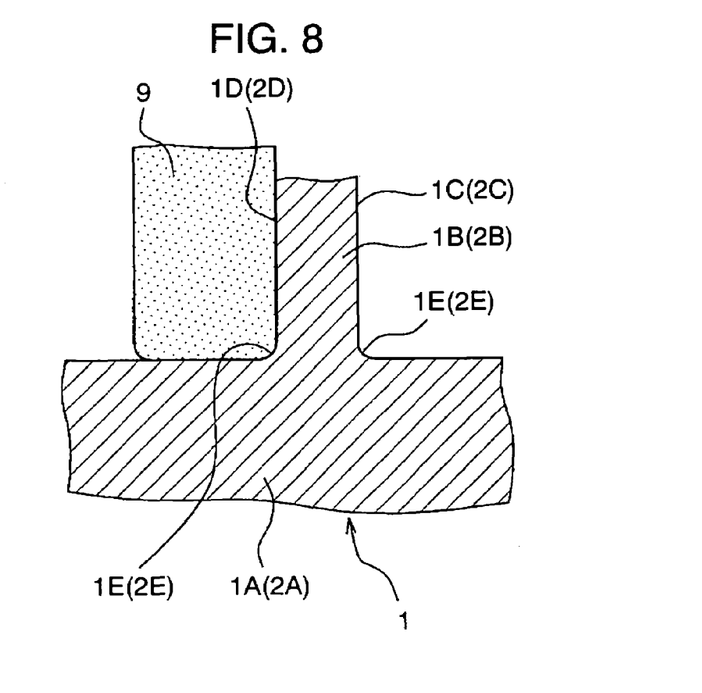
FIG. 8 is a schematic sectional view illustrating the machining method of a stationary scroll of a compressor in a fifth exemplary embodiment of the present invention.

FIG. 8 is a schematic sectional view illustrating a method for machining a stationary scroll in a fifth exemplary embodiment of the present invention. In the present exemplary embodiment, side faces 1C and 1D of wrap 1B and a face of end plate 1A in stationary scroll 1 are simultaneously Hale-machined and finished by non-rotational tool 9. The bottom part of non-rotational tool 9 has a minute curved surface corresponding to corner parts 1E provided at boundary parts between side faces 1C and 1D of wrap 1B and end plate 1A. Thus, each of corner parts 1E is provided to have a minute curved surface, thus improving the strength of wrap 1B. This provides a highly-reliable scroll compressor. The method as described above is applied to stationary scroll 1 is provided in the present exemplary embodiment as a typical example. However, the method also may be preferably applied to slewing scroll 2.

Sixth Exemplary Embodiment

Figure 9:
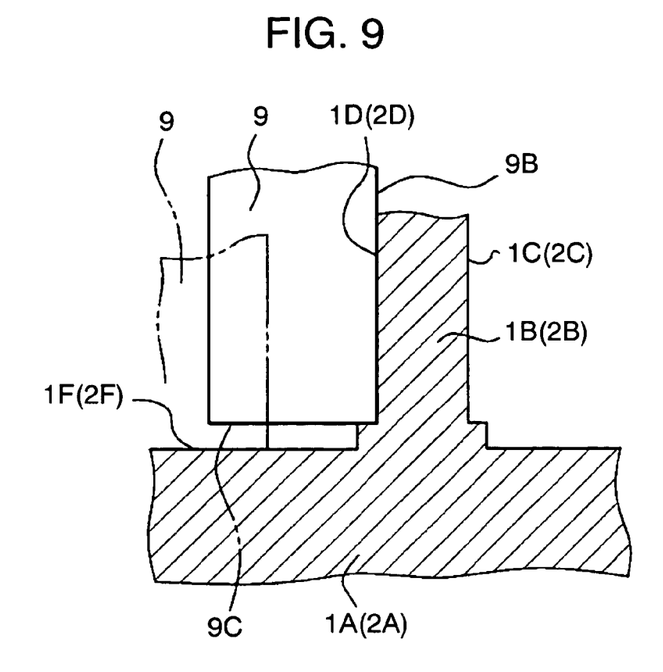
FIG. 9 is a schematic sectional view illustrating the machining method of a stationary scroll of a compressor in a sixth exemplary embodiment of the present invention.

FIG. 9 is a schematic sectional view illustrating a method for machining the stationary scroll in a sixth exemplary embodiment of the present invention. In the present exemplary embodiment, side faces 1C and 1D of wrap 1B and face 1F of end plate 1A in stationary scroll 1 are finished and machined by Hale-machining by separate steps as shown by the solid line and the phantom line by the same non-rotational tool 9.

As shown in FIG. 3B, the machining faces of non-rotational blade tool 9 are divided into the two parts, side face cutting blade (i.e., cutting edge) 9B for wrap 1B and tip end face cutting blade 9C for end plate 1A. This divided structure suppresses the load during machining from being accumulated. Also, machining by two faces of non-rotational toll 9, provides a longer service life to non-rotational tool 9.

The above effect also can be provided by separate machinings by two exclusive non-rotational tools for machining wrap 1B and machining end plate 1A, respectively. The method as described above is applied to stationary scroll 1 in the present exemplary embodiment as a typical example. However, the method also may be preferably applied to slewing scroll 2.

Seventh Exemplary Embodiment

Figure 10:
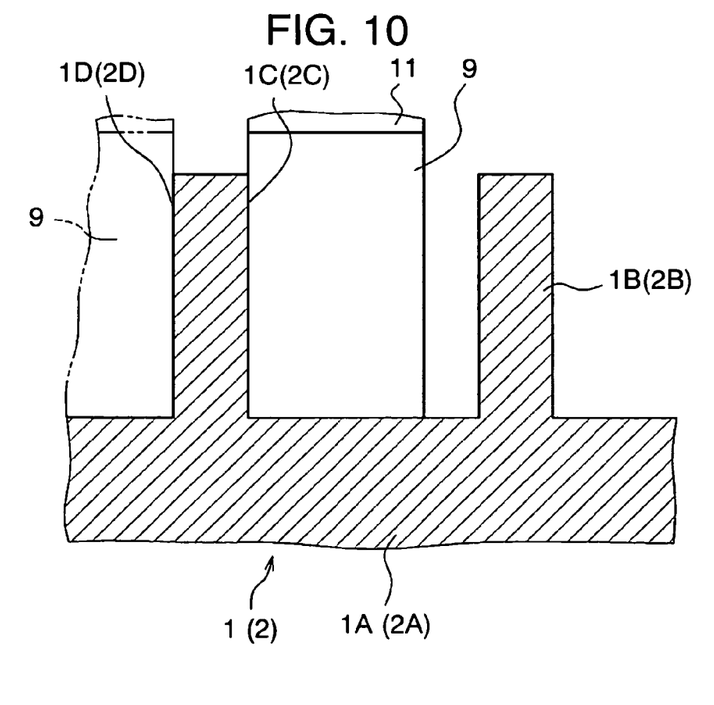
FIG. 10 is a schematic sectional view illustrating the machining method of a stationary scroll of a compressor in a seventh exemplary embodiment of the present invention.

FIG. 10 is a schematic sectional view illustrating a method for machining a stationary scroll in a seventh exemplary embodiment of the present invention. In the present exemplary embodiment, when wrap 1B of stationary scroll 1 is Hale-machined, inner face 1C is machined by non-rotational tool 9 as shown by the solid line. Thereafter, outer face 1D is machined by the same non-rotational tool 9 used for inner face 1C as shown by chain double-dashed line. As a result, both the inner face and outer face can be finished to have optimal scroll shapes while the same chucking status as that in the fourth exemplary embodiment is maintained. This provides a highly efficient scroll compressor. For example, after at least one of side faces 1C and 2D which slide relative to each other and at least one of side faces 1D and 2C are Hale-machined, the inner face and outer face of wrap 1B of scroll 1 are Hale-machined. Thus, operations for attaching and detaching a work (chucking apparatus) and for attaching and detaching non-rotational tool 9 as well as operations for adjusting the relative positions thereof are eliminated, thereby improving the operation efficiency. The method as described above is applied to stationary scroll 1 in the present exemplary embodiment as a typical example. However, the method also may be preferably applied to slewing scroll 2.

INDUSTRIAL APPLICABILITY

According to the present invention, the side face of a wrap has no or small swells produced by Hale machining in the longitudinal direction. Furthermore, the surface by Hale machining has a minute texture. Thus, the leakage of compressed gas is prevented from being caused at side faces which slide relative to each other of the respective wraps of a stationary scroll and a slewing scroll, thereby, improving the compression efficiency. Furthermore, the swells in the peripheral direction of the side face of the wrap are small and have a smooth texture. As a result, the circular orbit motion of the slewing scroll during operation is without minute vibration. This provides a quieter scroll compressor that has smaller operation noise than that of the conventional design. The machining by a non-rotating tool also eliminates the need for a spindle apparatus for rotating the tool. As a result, the cost for operating the machinery in a plant or for purchasing equipment can be reduced, thus lowering the cost for producing the scroll compressor.

It is noted that the respective characteristics of the present invention can be used separately or in various combinations in a possible range.

The invention claimed is:

1. A method for machining a scroll wrap, comprising:
   forming a stationary scroll having a stationary end plate and a stationary scroll wrap extending from said stationary end plate, said stationary scroll wrap of said stationary scroll having a side face,
   forming a slewing scroll having a slewing end plate and a slewing scroll wrap extending from said slewing end plate, said slewing scroll wrap of said slewing scroll having a side face,
   wherein said side face of said stationary scroll wrap and said side face of said slewing scroll wrap are configured to slide with respect to each other in use,
   wherein said side face of said stationary scroll wrap and said side face of said slewing scroll wrap each has a height extending from a respective one of said stationary end plate and said slewing end plate to a distal end; and
   non-rotating-tool machining said side face of one of said stationary scroll wrap and said slewing scroll wrap by moving along a longitudinal direction of said one of said stationary scroll wrap and said slewing scroll wrap a non-rotational blade such that said height is machined at one time,
   wherein a cutting edge of the non-rotational blade has a curved profile which is transferred to said height such that an optimum shape is provided when the one of said stationary scroll wrap and said slewing scroll wrap is driven in a compressor generating heat and pressure, and wherein said cutting edge has a length greater than the height of said one of said stationary scroll wrap and said slewing scroll wrap.

2. The method for machining a scroll wrap according to claim 1, further comprising:
   cutting-machining by end milling both said side face of said one of said stationary scroll wrap and said slewing scroll wrap and a surface of said end plate from which said one of said stationary scroll wrap and said slewing scroll wrap extends,
   wherein both said non-rotating-tool machining and said cutting-machining are performed while the one of said stationary scroll and said slewing scroll having said one of said stationary scroll wrap and said slewing wrap is fixed in a chuck.

3. The method for machining a scroll wrap according to claim 1, further comprising:
   machining a surface of one of said stationary end plate or said slewing end plate from which said one of said stationary scroll wrap and said slewing scroll wrap extends with the same non-rotational blade used for said non-rotating-tool machining of said side face of said one of said stationary scroll wrap and said slewing scroll wrap; and
   performing a finish cutting with a different non-rotational blade than that used for said non-rotating-tool machining of said side face of said one of said stationary scroll wrap and said slewing scroll wrap;
   wherein said non-rotating-tool machining, said machining, and said finish cutting are performed while the one of said stationary scroll and said slewing scroll having said one of said stationary scroll wrap and said slewing scroll wrap is fixed in a chuck.

4. The method for machining a scroll wrap according to claim 1, further comprising: simultaneously machining a surface of said end plate from which said one of said stationary scroll wrap and said slewing scroll wrap extends with the same non-rotational blade used for said non-rotating-tool machining of said side face of said one of said stationary scroll wrap and said slewing scroll wrap.

5. The method for machining a scroll wrap according to claim 1, further comprising: machining a surface of said end plate from which said one of said stationary scroll wrap and said slewing scroll wrap extends with a different non-rotational blade than that used for said non-rotating-tool machining of said side face of said one of said stationary scroll wrap and said slewing scroll wrap.

6. The method for machining a scroll wrap according to claim 1, wherein
   said side face of said one of said stationary scroll wrap and said slewing scroll wrap includes an inner side face and an outer side face; and
   wherein said non-rotating-tool machining is performed on said inner side face and said outer side face in any one of an order from said inner side face to said outer side face and an order from said outer side face to said inner side face.

7. The method for machining a scroll wrap according to claim 1, wherein said non-rotating-tool machining of said side face of said one of said stationary scroll wrap and said slewing scroll wrap is performed such that a resulting surface roughness of said side face of said one of said stationary scroll wrap and said slewing scroll wrap measures one micrometer at most.

* * * * *